United States Patent [19]
Tani et al.

[11] Patent Number: 4,588,467
[45] Date of Patent: May 13, 1986

[54] STATOR FOR ROTATING ELECTRIC MACHINE

[75] Inventors: Naoki Tani; Kazuyuki Aiba, both of Nagasaki, Japan

[73] Assignee: Mitsubishi Denki Kabushiki Kaisha, Tokyo, Japan

[21] Appl. No.: 647,642

[22] Filed: Sep. 6, 1984

[30] Foreign Application Priority Data

Nov. 7, 1983 [JP] Japan ............... 58-209423

[51] Int. Cl.$^4$ ............................. B32B 31/00
[52] U.S. Cl. ..................... 156/294; 29/596; 264/262
[58] Field of Search ............ 156/294; 264/262; 29/596

[56] References Cited

U.S. PATENT DOCUMENTS

| | | | |
|---|---|---|---|
| 1,946,619 | 2/1934 | Furman et al. | 264/262 X |
| 3,256,590 | 6/1966 | Myers | 29/596 |
| 3,418,411 | 12/1968 | Fawkes | 264/262 |

FOREIGN PATENT DOCUMENTS 42-2206 2/1967 Japan.
58-11946 1/1983 Japan.

*Primary Examiner*—David Simmons
*Attorney, Agent, or Firm*—Oblon, Fisher, Spivak, McClelland & Maier

[57] ABSTRACT

A stator for rotating electric machine includes a stator body having a stator core and a stator coil, a pair of stator clampers of a ring form which hold the stator core by clamping the same with their inner side surfaces from both sides of the stator core, a pair of stator supporting members of a ring form which are connected to the inside of a rotating machine frame so that each of the inner circumferential surfaces of the stator supporting members faces each of the outer circumferential surfaces of the stator clampers, an annular groove formed in at least one of the inner circumferential surface of the stator supporting members and the outer circumferential surface of the stator clampers, inlet and outlet ports formed in the stator clampers or the stator supporting members to be communicated with the annular groove, and an adhesive filled in the groove from the inlet with pressure.

3 Claims, 4 Drawing Figures

STATOR FOR ROTATING ELECTRIC MACHINE

BACKGROUND OF THE INVENTION

1. Field of the Invention

The present invention relates to a stator for rotating in an electric machine in which stator clampers holding a stator are secured to stator supporting members of a rotating electric machine frame with an adhesive, and a method of securing the stator clampers to the stator supporting body.

2. Description of Prior Art

FIG. 1 shows a conventional stator for a rotating electric machine. In the Figure, a reference numeral 2 designates a frame of a rotating electric machine. Inside the frame 2, a stator body 1 comprising a stator core 11 and a stator coil 14 is placed. A plurality of stator bars 12 are attached to the outer circumferential part of the stator core 11 by welding. A pair of stator clampers 13 which clamp the stator core 11 at both sides are connected to both end parts of the stator bars 12 by welding. A pair of stator supporting members 3 are secured to predetermined positions (corresponding to stator clampers 13) inside the frame 2 by welding or bolting. The stator clampers 13 are firmly connected to the stator supporting members 3 respectively with an adhesive for steel structures.

In the conventional stator as shown in FIG. 1, the stator body 1 is fixed to the frame 2 in such a manner that the adhesive is applied to the inner circumferential surface of the stator supporting members 3 or the outer circumferential surface of the stator clampers 13 and then the stator body 1 is inserted in the frame 2 to a position shown in FIG. 1 or the adhesive is filled between the stator supporting members 3 and the stator clampers 13 after the stator body 1 is inserted in the frame 2 at a position shown in FIG. 1. In the former method, however, a substantial amount of the adhesive previously applied is shaved between the stator supporting members 3 and the stator clampers 13 when the stator body 1 is inserted whereby the bonding strength at bonded parts is reduced. In the latter method, the adhesive is introduced in a space formed between the stator supporting members 3 and the stator clampers 13, on account of which it is necessary to use an adhesive having extremely low viscosity.

SUMMARY OF THE INVENTION

It is an object of the present invention to eliminate the disadvantage of the conventional stator for a rotating electric machine and to provide a stator for a rotating electric machine allowing use of an adhesive regardless of its viscosity and without causing shaving of the adhesive, by filling the adhesive under pressure between a stator supporting member and a stator clamper.

One aspect of the present invention is to provide a stator for rotating electric machine which comprises a stator body having a stator core and a stator coil, a pair of stator clampers of a ring form which hold the stator core by clamping the same with their inner side surfaces at both sides of the stator core, a pair of stator supporting members of a ring form which are attached to the inside of a rotating electric machine frame so that each of the inner circumferential surfaces of the stator supporting members faces each of the outer circumferential surfaces of the stator clampers, an annular groove formed in at least one of the inner circumferential surface of the stator supporting members and the outer circumferential surface of the stator clampers, inlet and outlet ports formed in the stator clampers or the stator supporting members to be communicated with said annular groove, and an adhesive filled in said groove from said inlet port with pressure.

Another aspect of the present invention is to provide a method of securing a stator body of a rotating electric machine to stator supporting member in a rotating electric machine frame through stator clampers by using an adhesive, which comprises forming an annular groove in at least one of the inner circumferential surface of the stator supporting members and the outer circumferential surface of the stator clampers, forming inlet and outlet ports for adhesive in the stator supporting members or the stator clampers to communicate with the annular groove and filling an adhesive with pressure from the inlet port.

BRIEF DESCRIPTION OF DRAWINGS

FIG. 2b is a an enlarged cross-sectional view taken along line II—II in FIG. 2a.

DETAILED DESCRIPTION OF THE PREFERRED EMBODIMENT

Figure 1:
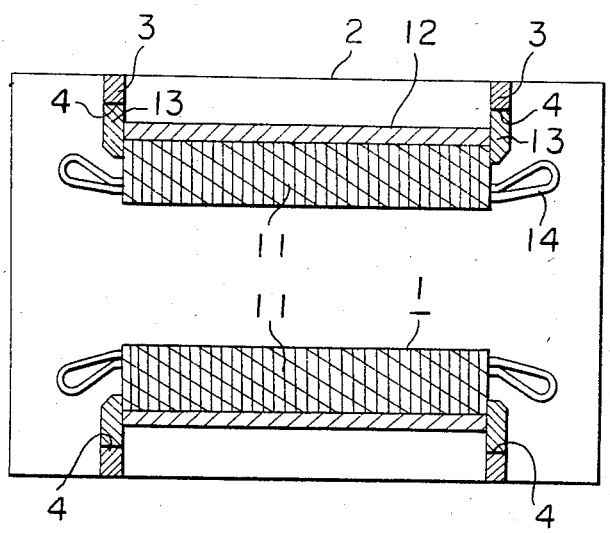
FIG. 1 is a cross-sectional view taken along the axial line of a conventional rotating electric machine (the rotor being omitted) provided with a stator body fixed to a frame by a conventional connecting method.
Figure 2A:
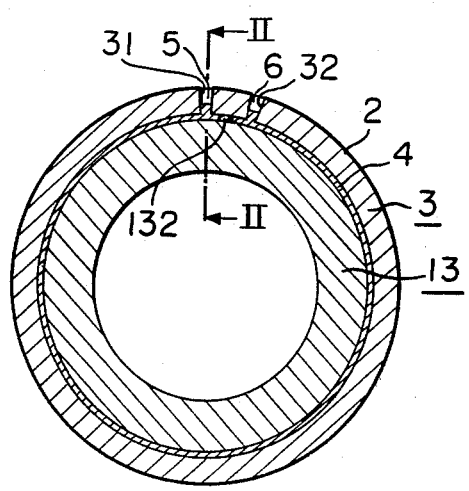
FIG. 2a is a cross-sectional view of a stator supporting member and a stator clamper for the purpose of illustration of an embodiment of the present invention.
Figure 2B:
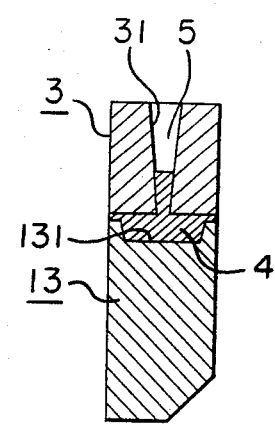

An embodiment of the present invention will be described with reference to FIGS. 2a and 2b in which the stator body and stator core are omitted for the sake of simplification of the drawing. An inlet 31 for an adhesive is formed in the stator supporting member 3 and an outlet port 32 is formed in the stator supporting member adjacent to the inlet port 31 for the adhesive. An annular groove 131 is formed in the outer circumferential surface of the stator clamper 13 so as to communicate with both the inlet port 31 for adhesive and the outlet port 32. A dam 132 is formed in the annular groove 131 of the stator clamper 3 at a position between the inlet port 31 and the outlet port 32 to isolate the inlet port 31 from the outlet port 32. Closing pins 5, 6 are respectively fitted to the inlet port 31 and the outlet port 32.

The stator body 1 is firmly connected to the frame 2 in such a manner that the stator body 1 is inserted into the frame 2 so that the stator clampers 13 clamping the stator body at both sides oppose the stator supporting member 3, the closing pins 5, 6 being previously removed and an adhesive is filled in the annular groove 131 through the inlet port 31 for adhesive by application of a pressure. Since the space formed between each of the stator supporting members 3 and each of the stator clampers 13 at both sides of the annular groove 131 is very small, the adhesive, when forcibly introduced, flows in the annular groove 131 in the counterclockwise direction in FIG. 2a to reach the dam 132. During flowing of the adhesive, a substantial amount of air in the annular groove 131 is discharged through the outlet port 32. The adhesive may leak from the small space between the stator supporting member 3 and the stator clamper 13. However, even at this time, the adhesive is prevented from flowing in the clockwise direction to directly reach the outlet port 32 because of presence of the dam 132. It is desirable to introduce the adhesive with pressure until it leaks outside from the outlet port 32. Then, closing pins 5, 6 are respectively inserted into the inlet port 31 and the outlet port 32 thereby finishing fixing operations for the stator body.

Figure 3:
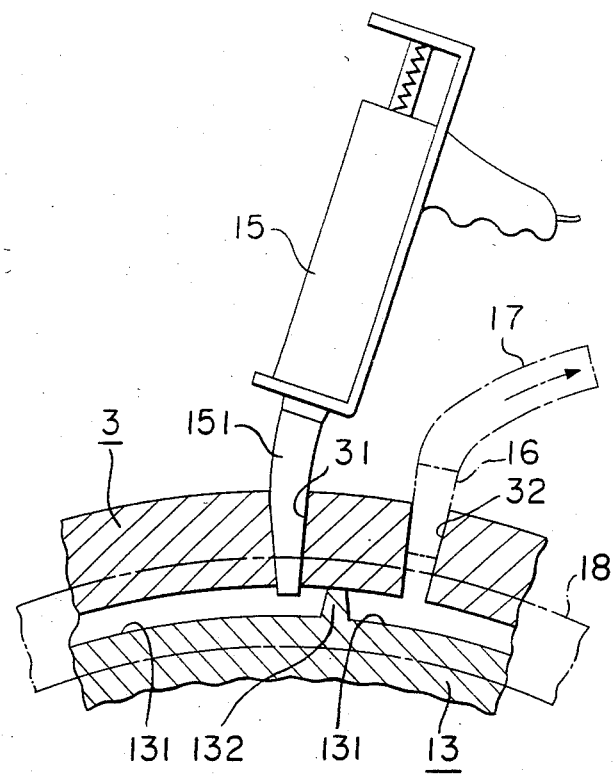
FIG. 3 is a diagram for illustrating an example of filling an adhesive in a space formed between the stator supporting member and the stator clamper.

Next several examples of forcible introduction of the adhesive into the annular groove 131 will be described with reference to FIG. 3. In FIG. 3, a nozzle 151 of an adhesive filling device 15 is inserted into the inlet port 31 for adhesive and the adhesive filling device 15 is actuated. Then, the adhesive ejected from the nozzle 151 is sent into the annular groove 131 in the counter-clockwise direction in FIG. 3 to reach the outlet port 32. To improve adhesive filling operations, a suction nozzle 16 may be inserted into the outlet port 32 to positively suck air in the annular groove 131 through a hose 17 by actuating a vacuum pump (not shown). Alternatively, a small gap formed between the stator supporting member 3 and the stator clamper 13 may be closed by a tape 18 while the suction nozzle 16 as above-mentioned is employed.

In the embodiment as above-mentioned, description has been made as to the annular groove 131 formed in the outer circumferential surface of the stator clamper 13. However, the annular groove 131 may be provided in the inner circumferential surface of the stator supporting member 3 or both of the stator clamper 13 and the stator supporting member 3. Further, the inlet port for adhesive may be provided at a diametrically opposed position rather than a position adjacent to the outlet port. In this case, it is unnecessary to form the dam 132.

The inlet port for adhesive and the outlet port may be provided in the stator clamper 13. Alternatively, either the inlet port for adhesive or the outlet port may be provided in the stator supporting member 3 and the other in the stator clamper 13.

As the adhesive used in the present invention, an epoxy series adhesive having characteristics of adequate fluidity without causing dripping, being applicable to an oily surface and durability to varnish may be preferably used.

In accordance with the present invention, an annular groove is formed in at least one of the inner circumferential surface of the stator supporting member and the outer circumferential surface of the stator clamper; an inlet port and an outlet port are formed in the stator supporting member or the stator clamper and an adhesive is filled with pressure in the annular groove from the inlet port. Accordingly, there occurs no problem of shaving the adhesive when the stator body is inserted into a frame and the viscosity of the adhesive is not limited as far as it can be introduced with pressure in the annular groove. The stator for a rotating electric machine according to the present invention provides reliable bonding strength between the stator body and the frame.

What is claimed is:

1. A method of securing a stator body of a rotating electric machine to stator supporting members in a rotating electric machine frame through stator clampers by using an adhesive, which comprises:

forming an annular groove in at least one of an inner circumferentially surface of said stator supporting members and an outer circumferential surface of said stator clampers;

forming inlet and outlet ports for an adhesive in said stator supporting members or said stator clampers to communicate with said annular groove;

filling said annular groove in a single radial direction with said adhesive under pressure via said inlet port; and blocking flow of said adhesive upstream of said outlet port so as to cause said overflowing of said adhesive from said outlet port.

2. The method according to claim 1, which further comprises overflowing of said adhesive filling said annular groove from said outlet port.

3. The method according to claim 1, which further comprises suctioning said adhesive from said outlet port.

* * * * *